United States Patent
Hoogenboom et al.

(10) Patent No.: US 11,926,262 B2
(45) Date of Patent: Mar. 12, 2024

(54) ADJUSTING INSTRUMENT, IN PARTICULAR FOR ADJUSTING AN EXTERIOR VISION UNIT OF A VEHICLE

(71) Applicant: MCi (Mirror Controls International) Netherlands B.V., Woerden (NL)

(72) Inventors: Rudolf Pieter Hoogenboom, Woerden (NL); Jannick Daniël Wijntjes, Woerden (NL); Jeyakrishna Sridhar, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 17/049,815

(22) PCT Filed: Apr. 23, 2019

(86) PCT No.: PCT/NL2019/050239
§ 371 (c)(1),
(2) Date: Oct. 22, 2020

(87) PCT Pub. No.: WO2019/209106
PCT Pub. Date: Oct. 31, 2019

(65) Prior Publication Data
US 2021/0237650 A1    Aug. 5, 2021

(30) Foreign Application Priority Data

Apr. 24, 2018 (NL) ..................................... 2020820

(51) Int. Cl.
*B60R 1/074* (2006.01)
*B60R 1/12* (2006.01)

(52) U.S. Cl.
CPC ................ *B60R 1/074* (2013.01); *B60R 1/12* (2013.01); *B60R 2001/1215* (2013.01); *B60R 2001/1223* (2013.01); *B60R 2001/1253* (2013.01)

(58) Field of Classification Search
CPC ... B60R 1/074; B60R 1/12; B60R 2001/1215; B60R 2001/1223; B60R 2001/1253;
(Continued)

(56) References Cited

U.S. PATENT DOCUMENTS

| | | | | |
|---|---|---|---|---|
| 6,130,514 A | * | 10/2000 | Oesterholt | .............. B60R 1/074 359/872 |
| 2003/0103142 A1 | * | 6/2003 | Hitomi | ...................... B60R 1/12 348/148 |

(Continued)

FOREIGN PATENT DOCUMENTS

| | | |
|---|---|---|
| CN | 1575239 A | 2/2005 |
| CN | 1938179 A | 3/2007 |

(Continued)

*Primary Examiner* — Balram T Parbadia
*Assistant Examiner* — Rahman Abdur
(74) *Attorney, Agent, or Firm* — Volpe Koenig

(57) ABSTRACT

Adjusting instrument for an exterior vision unit for a vehicle, comprising a base, a foot and a pivoting shaft extending therefrom along a longitudinal axis, and a housing surrounding the pivoting shaft and pivotable around the longitudinal axis in an adjustment range, between at least a park position and a work position. The base and the housing cooperate via cams which interlock in the work position so that the housing is in a stable axial ground position with respect to the foot. The cams, upon pivoting of the housing relative to the base, move apart from the work position along the longitudinal axis, and upon further pivoting are supported on each other, so that the housing is in an axially further removed position with respect to the foot. The adjusting instrument is provided with a detector configured to verify that the housing is in the stable axial ground position.

18 Claims, 8 Drawing Sheets

(58) Field of Classification Search
CPC ....... B60R 16/005; B60R 16/02; F16H 53/00; B60Y 2400/30; B60Y 2410/10; H01H 2231/026
USPC .......................................................... 359/871
See application file for complete search history.

(56) References Cited

U.S. PATENT DOCUMENTS

| | | | |
|---|---|---|---|
| 2005/0078389 A1* | 4/2005 | Kulas | B60R 1/04 |
| | | | 359/877 |
| 2007/0029180 A1 | 2/2007 | Brouwer | |
| 2013/0321941 A1* | 12/2013 | van Stiphout | B60R 1/06 |
| | | | 359/877 |

FOREIGN PATENT DOCUMENTS

| | | |
|---|---|---|
| EP | 3476654 A1 | 5/2019 |
| JP | 03-067239 U1 | 7/1991 |
| JP | 05-056633 U1 | 7/1993 |
| JP | 2001-270385 A | 10/2001 |
| KR | 10-2000-0011049 A | 2/2000 |
| KR | 10-2007-0007309 A | 1/2007 |
| WO | 97/43144 A1 | 11/1997 |
| WO | 00/047447 A1 | 8/2000 |
| WO | 2005/075249 A1 | 8/2005 |
| WO | WO-2005075249 A1 * | 8/2005 ............. B60R 1/074 |
| WO | 2012/047104 A1 | 4/2012 |

\* cited by examiner

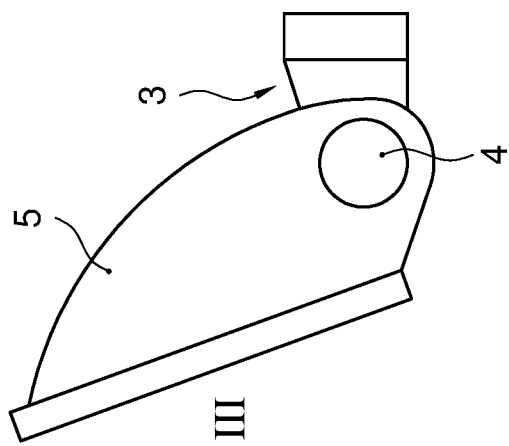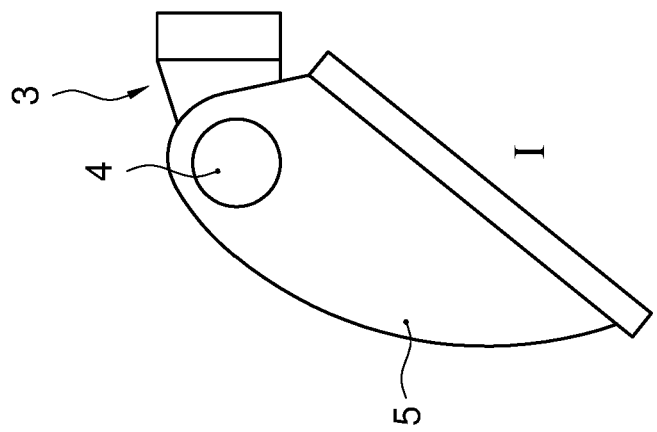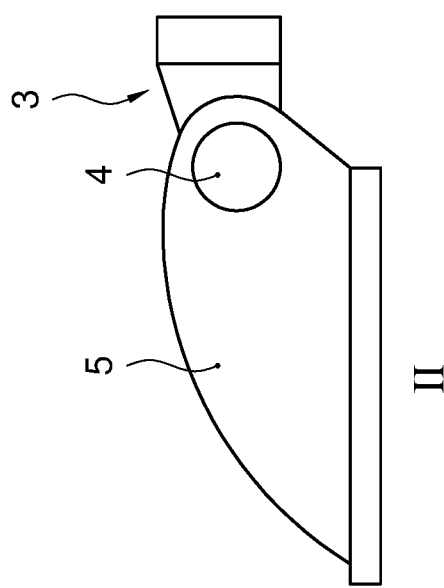

ADJUSTING INSTRUMENT, IN PARTICULAR FOR ADJUSTING AN EXTERIOR VISION UNIT OF A VEHICLE

CROSS REFERENCE TO RELATED APPLICATIONS

This application is a 35 USC § 371 National Stage application of International Patent Application No. PCT/NL2019/050239, which was filed Apr. 23, 2019, entitled "ADJUSTING INSTRUMENT, IN PARTICULAR FOR ADJUSTING AN EXTERIOR VISION UNIT OF A VEHICLE," which claims priority to Netherlands Patent Application No. 2020820, filed Apr. 24, 2018 and is incorporated herein by reference as if fully set forth.

The invention relates to an adjusting instrument for an exterior vision unit for a vehicle, in particular a motor vehicle, to observe and/or monitor the position of the vehicle with respect to the surroundings.

An adjusting instrument for an exterior vision element of a motor vehicle usually comprises a housing with an exterior vision unit, such as an exterior mirror, camera, LIDAR and/or display. The housing is usually adjustable relative to an adjusting instrument base to be mounted on the motor vehicle, in particular via an electric drive.

The adjusting instrument is often intended to adjust the exterior vision unit between a park position, for example a folded-in position in which the housing extends substantially along the vehicle, and a work position, for example a drive position, in which the housing extends substantially transversely to the vehicle.

Such an actuator is usually referred to by the term power fold actuator. The base of the adjusting instrument then often comprises a foot for mounting on an outer part of the body of the motor vehicle, and a shaft extending from the foot along a longitudinal axis of standing orientation with respect to the fixed world, for receiving the housing in a manner pivotable around it. Typically, the housing is connected to the base via a drive with its own electric motor, so that the pivoting movement by which the carrier folds in and folds out can be carried out in a driven manner.

A generally known type of adjusting instrument for adjusting an exterior vision unit of a motor vehicle comprises a base, comprising a foot and pivoting shaft extending from the foot along a longitudinal axis, and a housing which surrounds the pivoting shaft and which is pivotable around the longitudinal axis of the pivoting shaft in an adjustment range, between at least a park position and a work position.

From the viewpoint of operational reliability, it is important that the adjusting instrument in the work position is stable, so that, for instance, the housing in the work position, during driving, can sit on the base with as little vibration as possible. Also, it is important that the work position is well defined, so that, for instance, the housing in the work position has a fixed, predefined angular position with respect to the base and the vehicle fixedly attached thereto. In the work position, the exterior vision unit has a predetermined vision range, so that, for instance, the user, for instance via an exterior mirror, can look backwards, and so that electronic aids, via the camera or LIDAR, can monitor the position of the vehicle with respect to the surroundings, for instance, monitor the blind spot or monitor the driving position on the roadway.

To provide a stable, well defined work position, it has previously been proposed, in the embodiment of FIG. 10 of WO 2012/047104, to have the base and the housing of the adjusting instrument cooperate via cams which interlock in the work position so that the housing is in a stable axial ground position with respect to the foot, and which upon pivoting of the housing relative to the base move apart relative to each other from the work position along the longitudinal axis, and upon further pivoting are supported on each other, so that the housing is in an axially further removed position with respect to the foot than in the work position. In the axially further removed position, for instance, the housing can then be pivoted relative to the base relatively simply in a stable and/or force efficient manner.

While such an adjusting instrument offers many advantages, it has as a drawback that the work position is not entirely uniform. Upon manual adjustment of the housing relative to the base, it may occur that the user thinks that the work position has been reached, whereas the cams have not wholly interlocked yet. Also upon electrically driven adjustment, whereby the housing is adjustable relative to the base via an electric drive operative between the housing and the base, this can happen. In electric adjustment it is customary for the electric drive to be switched off with the aid of a current limiting circuit, which is indicative of the electric motor coming to a halt due to the cams interlocking and preventing further rotation. At lower temperatures, or in the event of unexpected resistance due to an external force being exerted on the housing, the current limiting circuit switches off, while the housing with respect to the foot is not in the axial ground position. Especially when the exterior vision unit is provided with electronic aids which monitor the vehicle with respect to the surroundings, this may be problematic because the vision range then does not correspond to that of the work position, without this being signaled.

The invention contemplates a drive for an adjusting instrument with which, whilst maintaining the advantages mentioned, the disadvantages mentioned can be counteracted.

To this end, the invention provides a drive for an adjusting instrument, in particular according to claim 1, comprising a base, comprising a foot and a pivoting shaft extending therefrom along a longitudinal axis, and a housing which surrounds the pivoting shaft, and which is pivotable around the longitudinal axis of the pivoting shaft in an adjustment range, between at least a park position and a work position, wherein the base and the housing cooperate via cams which in the work position interlock so that the housing is in a stable axial ground position with respect to the foot, and which, upon pivoting of the housing relative to the base, move apart relative to each other from the work position along the longitudinal axis, and upon further pivoting are supported on each other, so that the housing is in an axially further removed position with respect to the foot than in the work position, wherein furthermore there is provided a detector which is configured to verify that the housing is in the stable axial ground position.

By providing a detector which verifies that the housing is in the stable axial ground position, it can be achieved that it can be monitored that the housing with respect to the foot is in the axial ground position, and hence that the adjusting instrument is in actual fact in the work position, so that the vision range corresponds to that of the work position. The stable axial ground position can be achieved by, for example, an axial or radial interlocking of housing and base in the work position. Thus, the stable axial ground position can be a rotation-locked work angular position which is correspondent with the work position, in which the base and the housing cooperate via stops biased towards each other which in the work angular position interlock, for instance, radially so that the housing is in a stable rotation-locked ground position with respect to the foot, and which upon pivoting of the housing relative to the base come from the work angular position, against the bias, out of radial engagement, and upon further pivoting are decoupled, so that the housing around the pivoting shaft is in a further rotated position with respect to the foot than in the work angular position. In this way, the detector can monitor that the housing with respect to the foot is in the stable rotation-locked ground position, and hence that the adjusting instrument is in actual fact in the work angular position, so that the vision range corresponds to that of the work position. As an alternative, the stable axial ground position can be a rotation-locked work angular position which is correspondent with the work position, in which the base and the housing cooperate via stops biased towards each other which in the work angular position interlock axially so that the housing is in a stable rotation-locked ground position with respect to the foot, and which upon pivoting of the housing relative to the base come from the work angular position, against the bias, out of axial engagement, and upon further pivoting are decoupled without the housing being around the pivoting shaft in a further rotated position with respect to the foot.

When the detector by movement of the housing relative to the foot is switchable between a confirming condition corresponding to the stable axial ground position, and a non-confirming condition corresponding to a position removed from the ground position, it can be achieved that the reaching of or the leaving from the ground position gives the turnover for the verification. This relative movement of the housing with respect to the foot can comprise, for example, a pivotal movement around the pivoting axis and/or axial movement along the pivoting axis, in particular a relative movement to or from the ground position. The stable ground position can be a stable axial position and/or a work angular position. The position removed from the ground position can accordingly be a rotated angular position and/or an axial displacement. When the detector is switchable by axial movement of the housing relative to the foot, between the confirming condition corresponding to the stable axial ground position, and a non-confirming condition corresponding to a position axially removed from the ground position, it can be achieved that the axial movement of the adjusting mechanism to or from the ground position gives the turnover for verification. As an alternative or as an addition, the detector may be switchable by rotation of the housing relative to the foot, between a confirming condition corresponding to a work angular position correspondent with the stable axial ground position, and an angular position rotated with respect to the work angular position, which corresponds to the non-confirming position. That is, the detector can be switchable by a pivoting of the housing relative to the foot around the pivoting axis to and/or from the ground position.

When the detector comprises cooperating electric contact surfaces, it can be achieved that the contact surfaces can cooperate, for instance, to pass electric current in the axial ground position, or, conversely, to interrupt it in the ground position. The cooperating contact surfaces may for instance be arranged on the cams, or elsewhere, for example between housing and pivoting shaft or foot.

When the detector comprises a switch, in particular a microswitch, efficient use can be made of the movement, in particular the axial movement, which the housing performs with respect to the base near the work position as a result of the interlock of the cams. When the switch is arranged on a printed board, in particular a PCB, included in the adjusting instrument, and where the switch includes an arm which cooperates with a stop on the base, in particular on the pivoting shaft, the detector can be implemented in a particularly operationally reliable and cost effective manner. The printed circuit board on which the switch may be included may for instance be the same printed circuit board on which the motor control is accommodated, and on which, for example, also the current limiting circuit may be included. In the ground position, the switch can then be in the confirming condition, and as soon as the adjusting device through cooperation of the cams comes out of the ground position, the switch can go over to the non-confirming condition due to the switch, during the axial movement of the housing relative to the foot, cooperating via the arm with the stop, and vice versa.

When the housing is adjustable relative to the base via an electric drive operative between the housing and the base, adjustment can be automated in a simple manner. As an alternative or in addition, the housing may be manually adjustable relative to the base. Elegantly, the housing is adjustable under the influence of external force, for example during a collision with an external object or during manual adjustment, and to this end a break coupling is included in the drive between housing and base. Especially when the electric drive is of self-braking design, an external force damaging the drive can be counteracted in this way.

When the electric drive is provided with a current limiting circuit which is configured to switch off upon the electric motor coming to a halt, damaging of the electric motor can be counteracted when the adjustment of the housing relative to the base jams.

As an alternative or in addition, the detector can comprise a sensor to verify that the housing is in the stable axial ground position. Such a sensor can comprise, for example, a pressure sensor, a light sensor, a capacitive sensor, an inductive sensor, a resistive sensor, a piezoelectric sensor, a potentiometer or a Hall sensor. Such a pressure sensor is especially advantageous when in the stable axial ground position the housing bears on the base under spring action, for instance such that the cams are pressed onto each other.

The cooperating cams may be elegantly provided on, respectively, the base, in particular the foot, and the housing. In this way, in a relatively simple manner, an axial lift movement can be implemented of the housing relative to the base when it is being adjusted from the work position. The axially further removed position can then be a position raised with respect to the foot.

The cooperating cams can comprise, respectively, a base cam ring provided on the base and a housing cam ring provided on the housing, which in the adjustment range interlock only in the work position. In this way, it can be achieved that the housing, outside the work position, can be supported on the base via a relatively large contact surface, so that the surface pressure can be low and the adjustment can be stable. The base cam ring can then be arranged, for example, on the foot, and the housing cam ring can then be arranged, for example, on the underside of the housing, facing the foot.

When the housing of the adjusting instrument encloses the detector, such that the detector is screened off from the surroundings, the operational reliability of the adjusting instrument can be further enhanced.

When the adjustment range comprises a park position and a fold-over position, with an intermediately located work position corresponding to a drive position, it can be achieved that the housing can move two ways from the work position under the influence of an external force. It is noted, for that matter, that the adjusting device need not necessarily have just one work position, but that provision may also be made for multiple, mutually different work positions, e.g. a reversing position so as to present the driver with a different field of view when reversing the vehicle into a parking space.

The invention also relates to an exterior vision unit for a vehicle, in particular a motor vehicle, comprising an adjusting instrument as described above, and a mirror, display, LIDAR and/or camera coupled with the housing. It is noted that the technical features of the drive described in the paragraphs hereinabove can each by themselves also be advantageously used in a drive with another configuration, i.e., the individual technical features can, if desired, be isolated from their context and be applied alone, and, if desired, be combined with one or several of the above-mentioned features.

The invention will be further elucidated on the basis of exemplary embodiments of adjusting instruments which are shown in drawings. In the drawings:

FIG. 2A is a simplified schematic top plan view of the adjusting instrument according to the invention in the work position;

FIG. 2B is a simplified schematic top plan view of an adjusting instrument according to the invention in the park position;

FIG. 2C is a simplified schematic top plan view of an adjusting instrument according to the invention in a fold-over position;

Figure 7B:
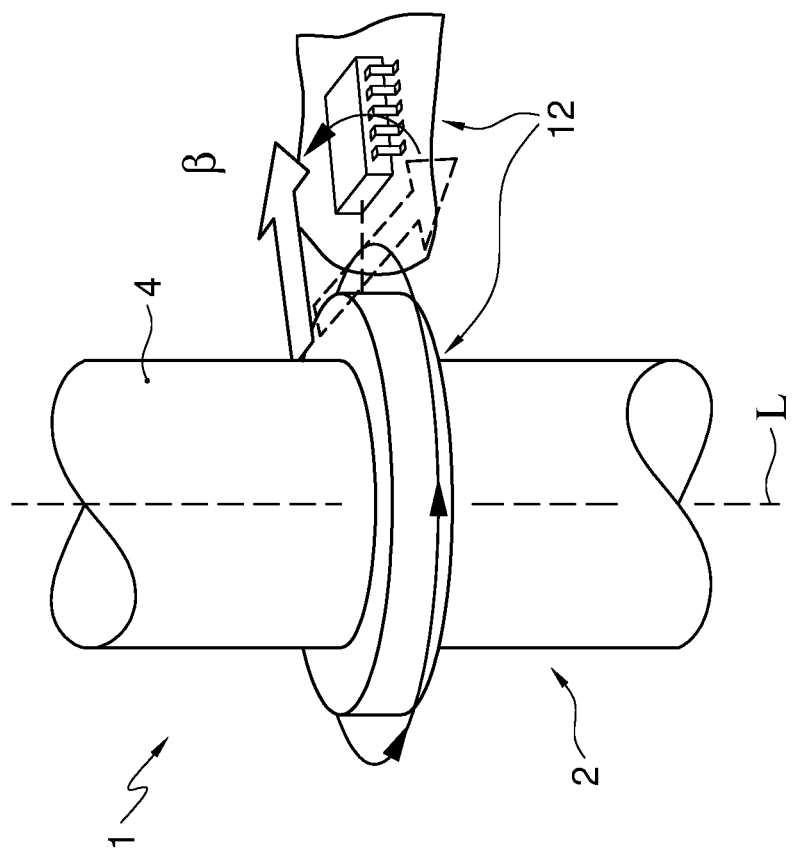
FIG. 7A is a schematic perspective view of a rotation sensor for a third embodiment of an adjusting instrument according to the invention in a work angular position corresponding to the work position.
Figure 8:
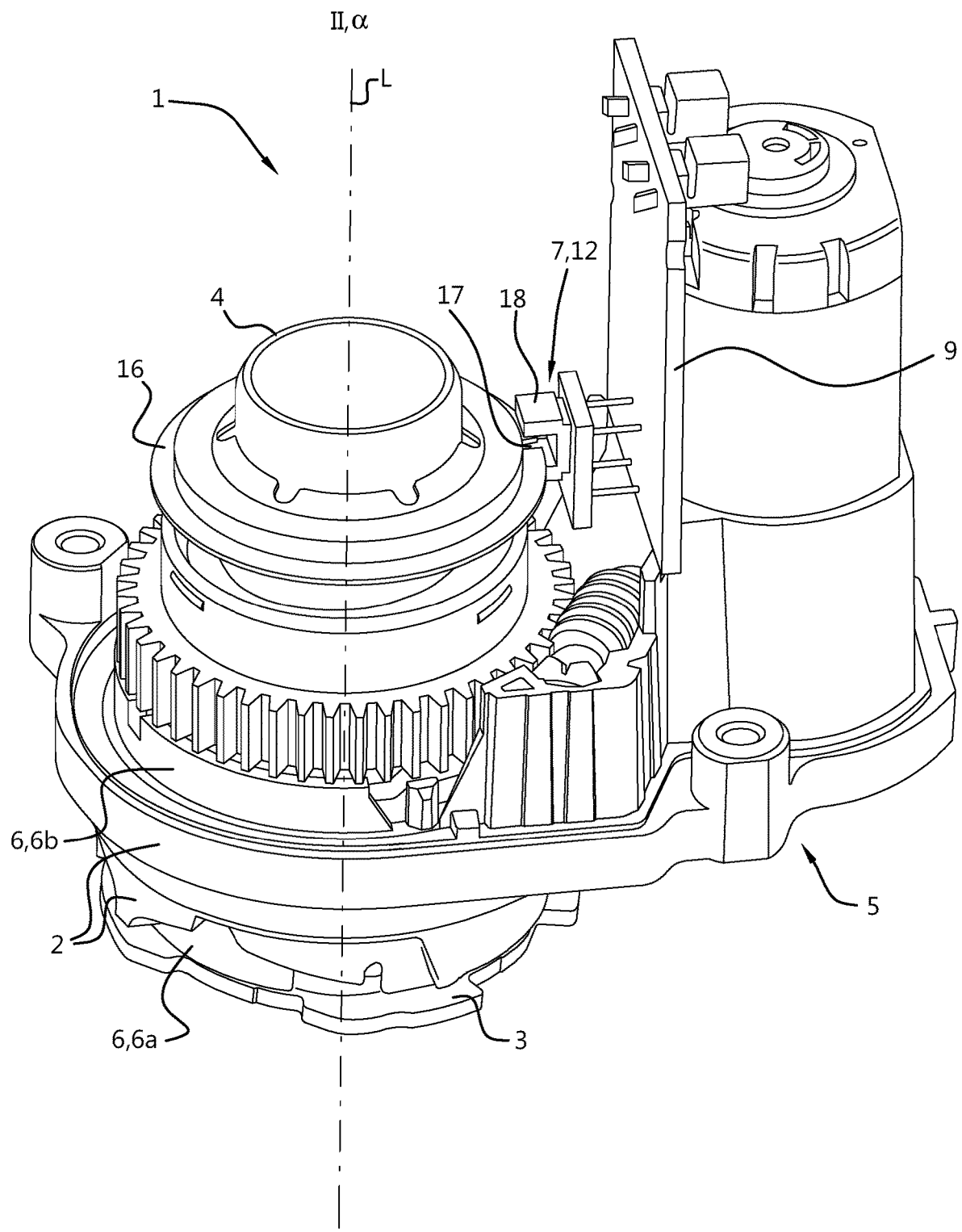

FIG. 7B is a schematic perspective view of a rotation sensor for a fourth embodiment of an adjusting instrument according to the invention in an angular position rotated with respect to the work angular position; and FIG. 8 is a schematic perspective assembled simplified view of a fifth embodiment of an adjusting instrument according to the invention in a work angular position corresponding to the work position.

It is noted that the figures are only schematic representations of preferred embodiments of the invention, and that these are given by way of non-limiting exemplary embodiments. In the exemplary embodiments, like or corresponding parts in the different embodiments are designated with the same reference numerals.

Figure 1A:
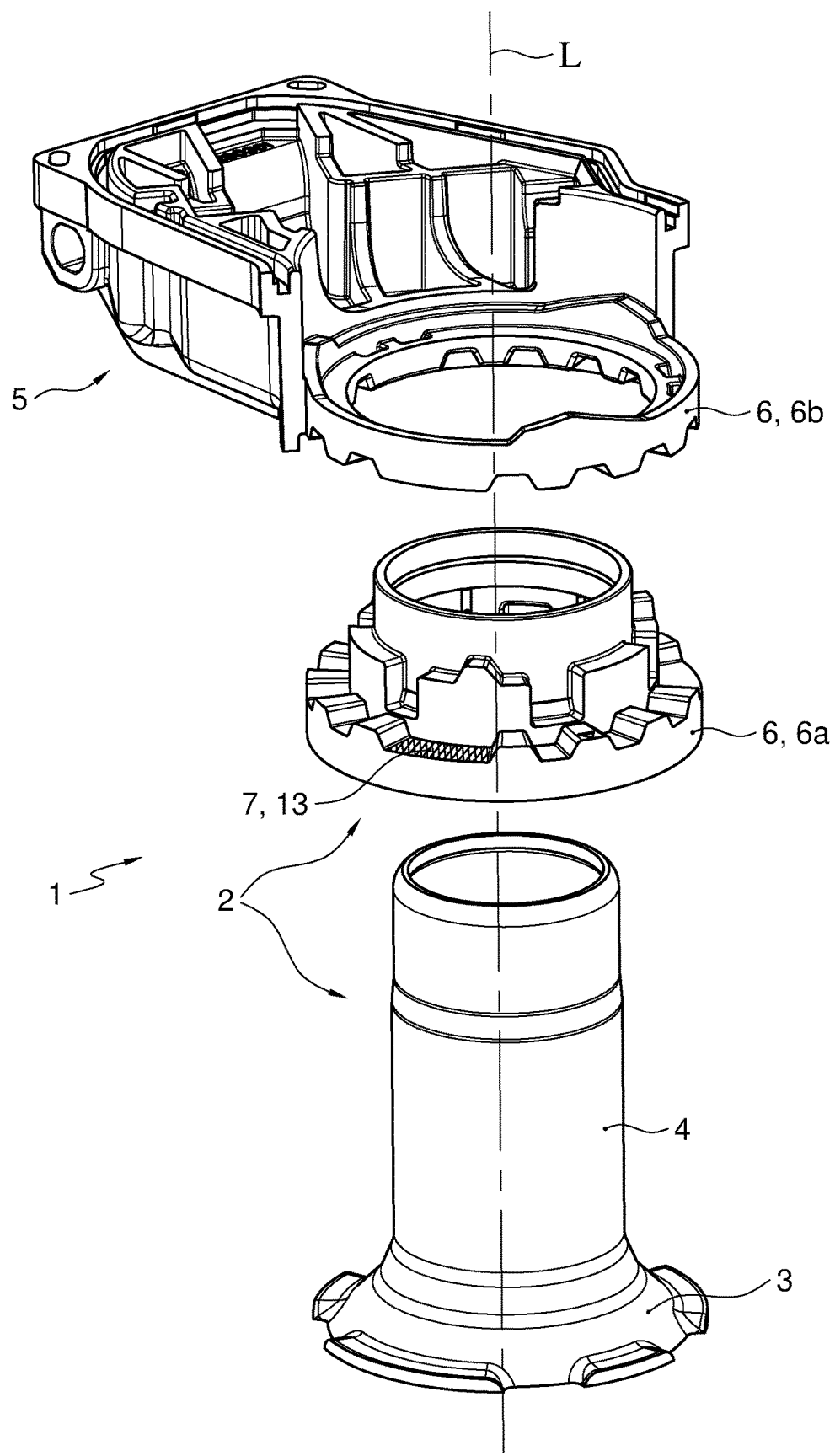
FIG. 1A is a schematic perspective exploded simplified top view of an adjusting instrument according to the invention.
Figure 1B:
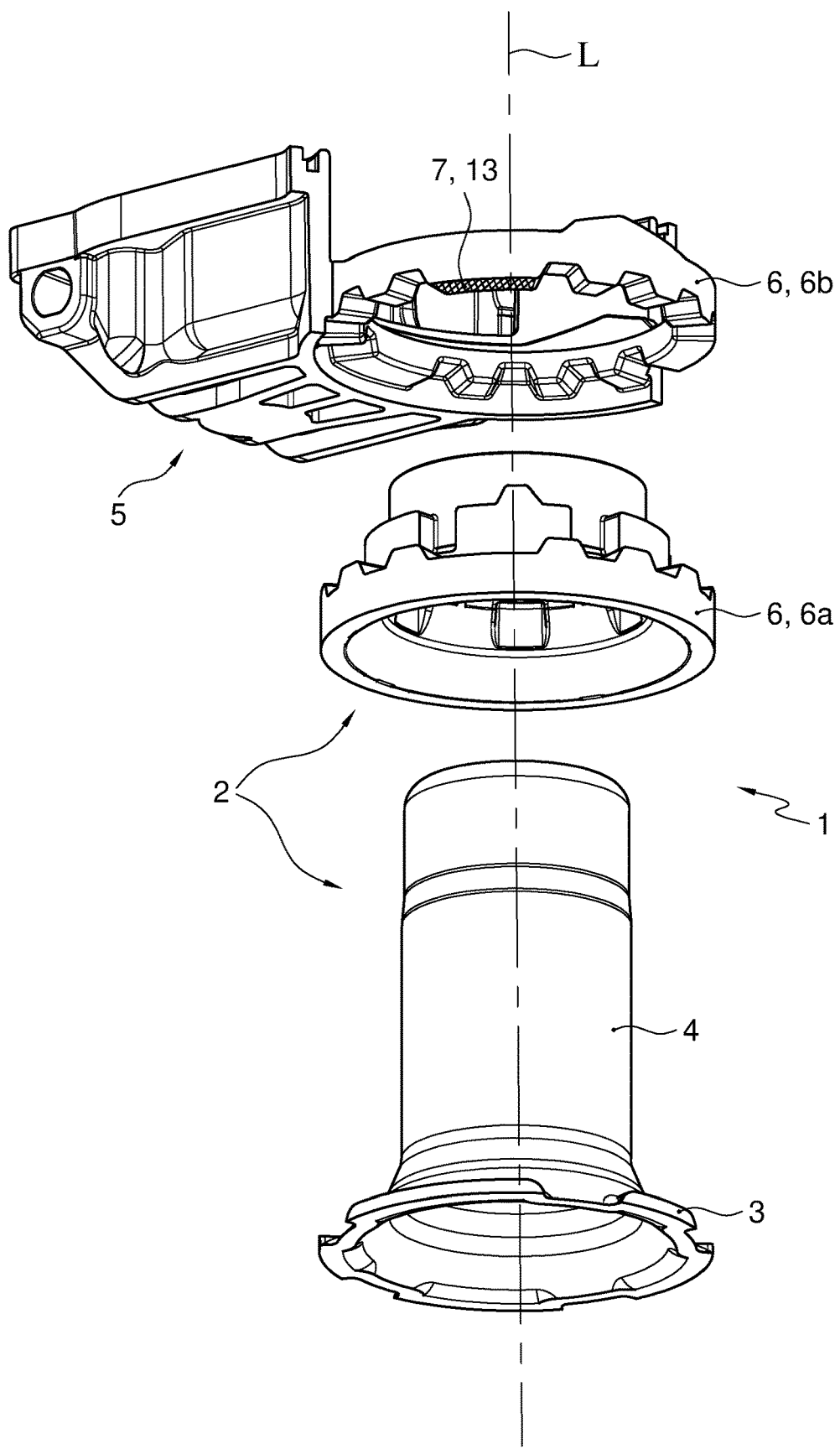
FIG. 1B is a schematic perspective exploded bottom view of the adjusting instrument of FIG. 1A.

FIGS. 1A and 1B show an embodiment of an adjusting instrument 1 for an exterior vision unit for a vehicle, in particular a motor vehicle, in disassembled condition. The adjusting instrument 1 comprises a base 2. The base 2 comprises a foot 3 and a pivoting shaft 4 extending therefrom along a longitudinal axis L. In this disassembled condition, these are shown as loose parts. In the assembled condition, they constitute a whole. Naturally, they may also be formed as one piece. A lower half, shown in these figures, of a housing 5 surrounds the pivoting shaft 4, and the housing 5 is pivotable around the longitudinal axis L of the pivoting shaft 4 in an adjustment range. In the adjustment range, the housing 5 is pivotable between at least a park position I and a work position II, where the base 2 and the housing 5 cooperate via cams 6. An outer cap of the housing 5 and the park position I, the work position II and a fold-over position III are shown in FIGS. 2A, 2B and 2C and will be elucidated further on. In this exemplary embodiment, the cooperating cams 6 comprise respectively a base cam ring 6a provided on the base 2 and a housing cam ring 6b provided on the housing 5. The base cam ring 6a is arranged on the foot 3 in a rotation-locked manner, as can be seen, for example, in FIGS. 3-5. The housing cam ring 6b is arranged on the underside of the lower half of the housing 5, facing the foot 3. The cams 6 interlock with each other in the work position II, as shown, for example, in FIG. 3, so that the housing 5 is in a stable axial ground position A with respect to the foot 3. Upon pivoting of the housing 5 relative to the base 2, the cams 6 move apart with respect to each other from the work position II along the longitudinal axis L, as shown, for example, in FIG. 4. Upon further pivoting, the cams 6 are supported on each other, so that the housing 5 is in an axially further removed position B with respect to the foot 3 than in the work position II, as can be seen, for example, in FIG. 5. Further, there is provided a detector 7 which is configured to verify that the housing 5 is in the stable axial ground position. In FIG. 1 and FIGS. 3-5, a first embodiment of the detector 7 is shown, where the detector 7 comprises cooperating electric contact surfaces 13 arranged on the cams 6, that cooperate in the stable axial ground position A to allow electric current to pass. This corresponds to a confirming condition in which it is confirmed that the housing 5 is in actual fact in the stable axial ground position A. When the electric contact surfaces 13, as a result of pivoting of the housing 5 relative to the foot 3, move apart, the electric current is interrupted. This corresponds to a non-confirming condition in which it is not confirmed (anymore) that the housing 5 is in the stable axial ground position A. Alternatively, the contact surfaces 13 may, conversely, interrupt the electric current in the stable axial ground position A. It will be clear to a person skilled in the art that the contact surfaces 13 may also be arranged at a location other than on the cams 6, such as, for example, between the housing 5 and pivoting shaft 4 or foot 3.

As an alternative or in addition, the detector 7 may comprise a sensor 14 to verify that the housing 5 is in the stable axial ground position A. Such a sensor 14 may comprise, for example, a pressure sensor, a light sensor, a capacitive sensor, an inductive sensor, a resistive sensor, a piezoelectric sensor, a potentiometer, or a Hall sensor.

FIGS. 2A-C show a simplified schematic top plan view of an adjusting instrument 1 according to the invention in, respectively, a work position II, a park position I and a fold-over position III. In this exemplary embodiment, the outer cap of the housing 5 is shown with an exterior vision unit, in particular an exterior mirror. It will be clear to a person skilled in the art that an exterior vision unit comprising a camera, LIDAR, other electronic observation means and/or display is also possible.

Figure 3:
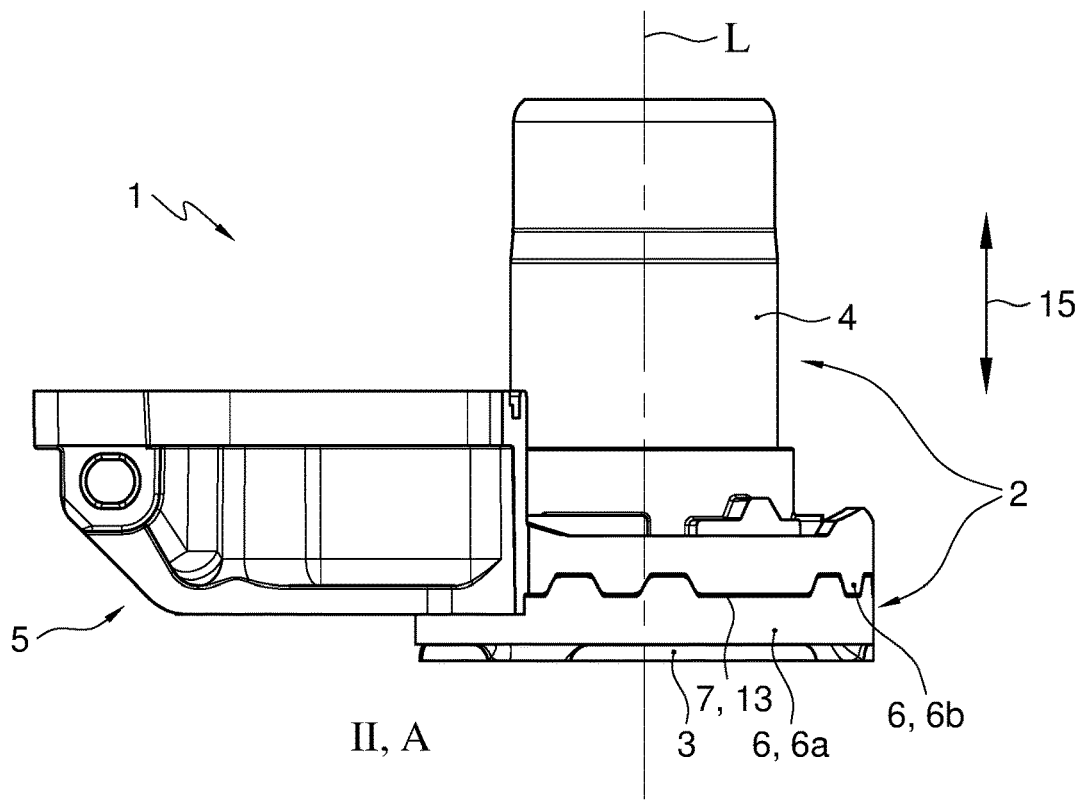
FIG. 3 is a schematic side view of the adjusting instrument of FIGS. 1A and 1B in the stable axial ground position of the work position.
Figure 4:
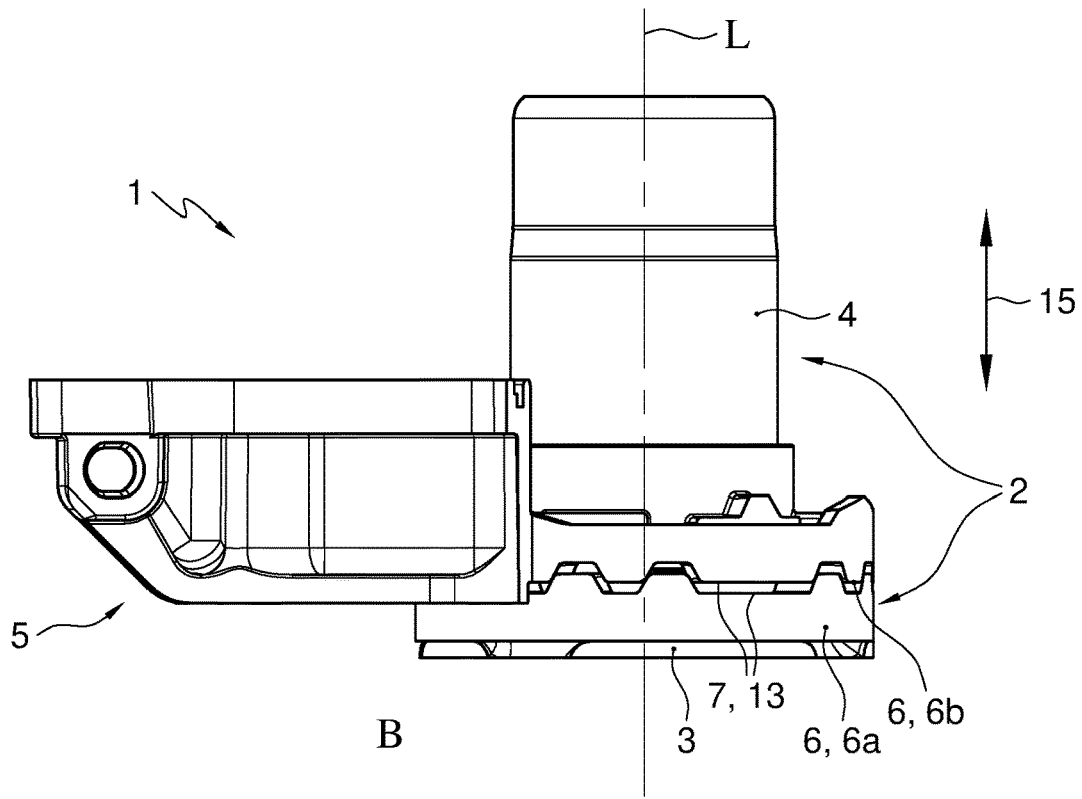
FIG. 4 is a schematic side view of the adjusting instrument of FIG. 3 in an intermediate position.
Figure 5:
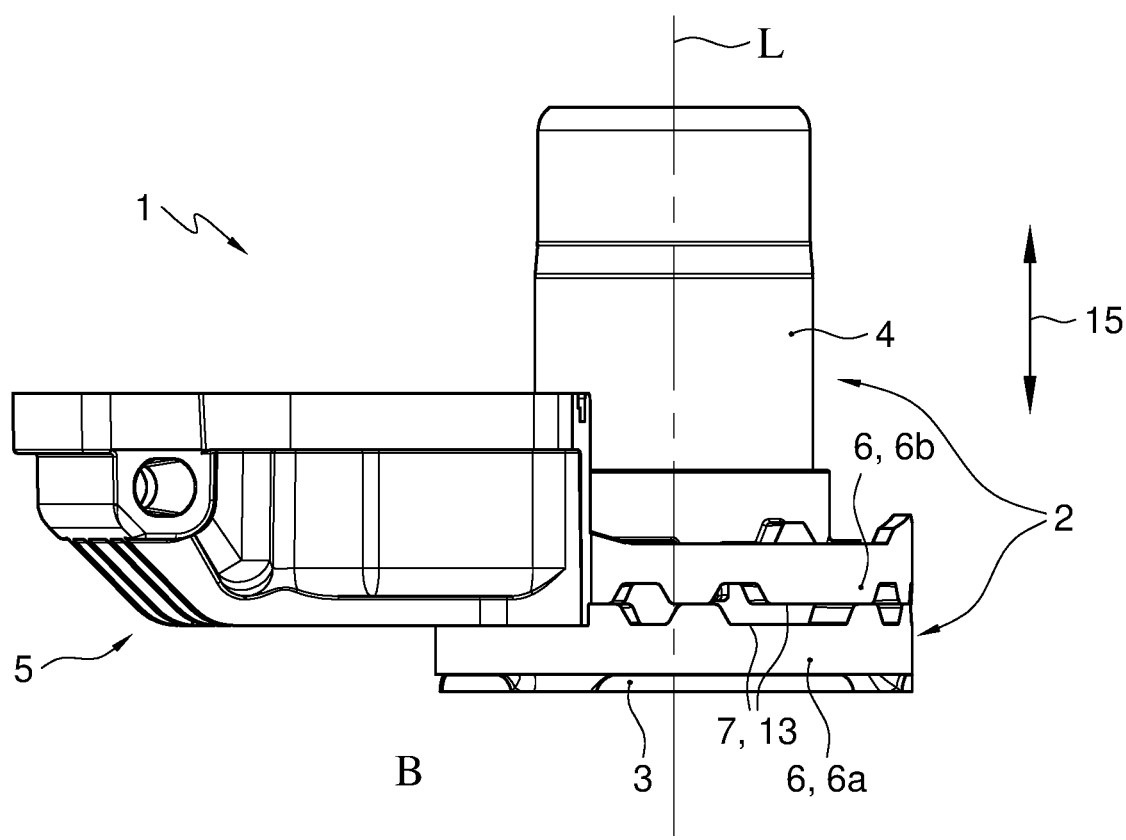
FIG. 5 is a schematic side view of the adjusting instrument of FIG. 3, in which the housing is in an axially further removed position with respect to the foot than in the work position.

FIG. 3 shows a schematic side view of the adjusting instrument 1 of FIG. 1A and FIG. 1B in the stable axial ground position A of the work position II. It can be seen here that the cooperating cams 6 in the work position II interlock. FIG. 4 also shows a schematic side view of the adjusting instrument 1 of FIG. 3. Upon pivoting of the housing 5 relative to the base 2, cams 6 move apart relative to each other from the work position II along the longitudinal axis L to a so-called intermediate position. Furthermore, FIG. 5 shows a schematic side view of the adjusting instrument 1 of FIG. 3 in which the housing 5 is in an axially further removed position B with respect to the foot 3 than in the work position II. In this axially further removed position B, the cams 6 are supported on each other.

Figure 6:
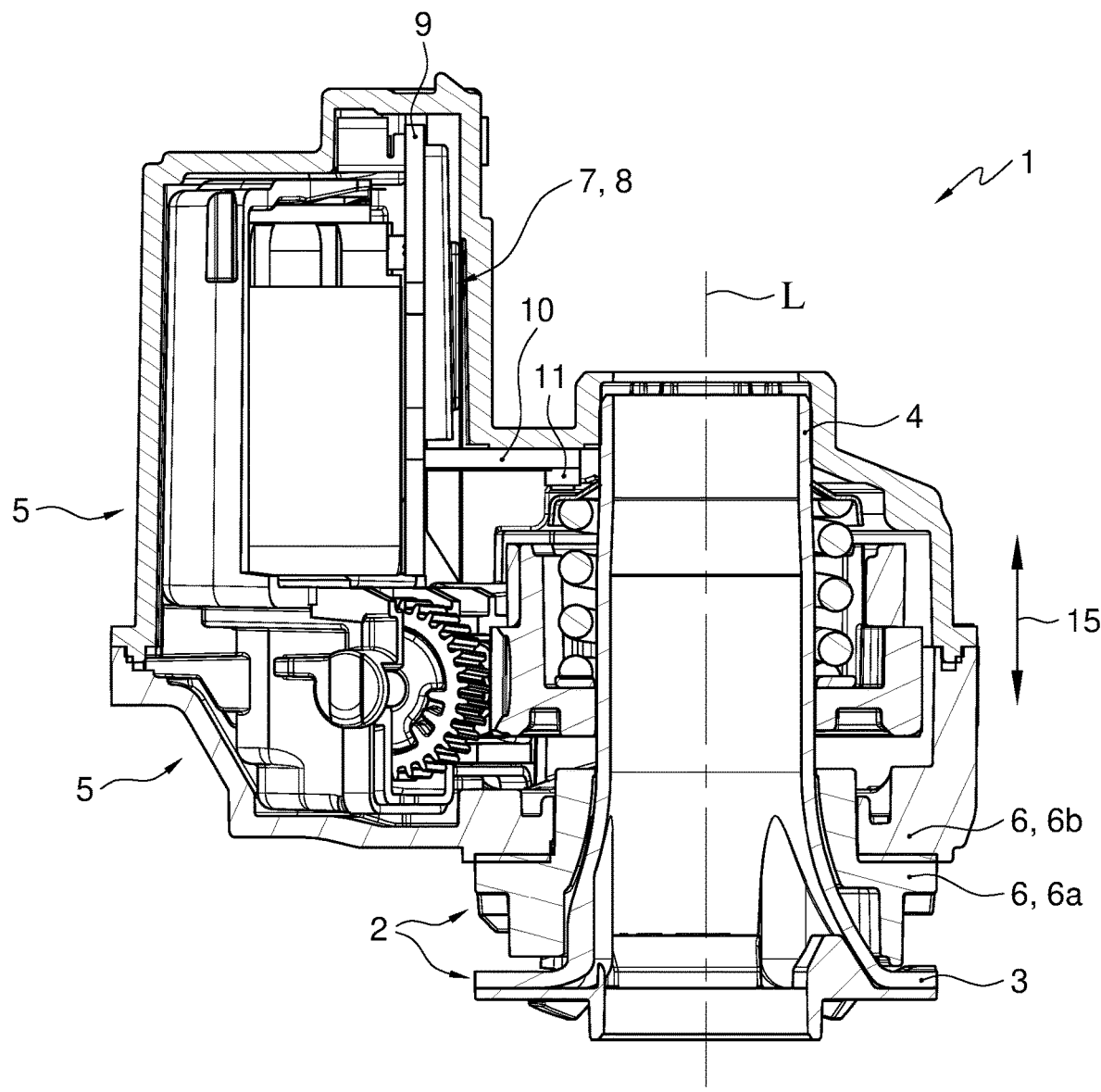
FIG. 6 is a schematic perspective detailed view of a cross section of an adjusting instrument according to the invention.

FIG. 6 shows a detailed view of a cross section of a second embodiment of an adjusting instrument 1 according to the invention. In this embodiment, the detector 7 is switchable by movement of the housing 5 relative to the foot 3, between a confirming condition corresponding to the stable axial ground position A, and a non-confirming condition corresponding to a position B removed from the ground position A. To this end, the detector 7 of the second embodiment comprises a switch 8, in particular a microswitch. The switch 8 is arranged on a printed board 9 (PCB) included in the adjusting instrument 1. The switch 8 is provided with an arm 10 which cooperates with a stop 11 on the base 2, in particular on the pivoting shaft 4. The detector 7 is switchable by axial movement 15 of the housing 5 relative to the foot 3, between the confirming condition corresponding to the stable axial ground position A, and a non-confirming condition corresponding to a position B axially removed from the ground position A. The axial movement 15 of the adjusting instrument 1 to or from the stable axial ground position A gives the change for the purpose of the verification. In the stable axial ground position A, the switch 8 is in the confirming condition. As soon as the adjusting instrument 1 through cooperation of the cams 6 leaves the stable axial ground position A, the switch 8 changes to the non-confirming condition in that it cooperates, during the axial movement 15 of the housing 5 relative to the base 2, via the arm 10 with the stop 11, and vice versa.

Figure 7A:
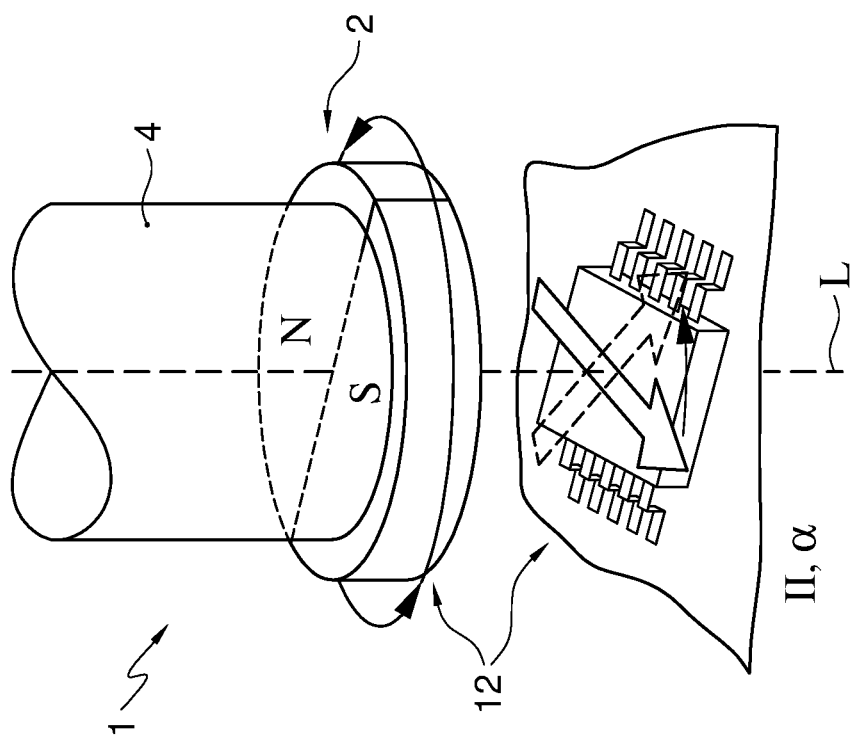

FIGS. 7A and 7B show a schematic perspective view of a rotation sensor 12 of respectively a third embodiment and a fourth embodiment of an adjusting instrument 1 according to the invention in respectively a work angular position α correspondent with the work position, and an angular position that is outside the work position. By rotation of the housing 5 relative to the foot 3, the rotation sensor 12 is switchable between a confirming condition corresponding to the work angular position α correspondent with the stable axial ground position A, and an angular position β rotated with respect to the work angular position α, which corresponds to the non-confirming condition. In this exemplary embodiment, the rotation sensor 12 is implemented as a magnetic angle sensor, with a two-pole magnet arranged above an integrated circuit. The integrated circuit can directly observe the angle of the magnetic field, for example by means of one or more of a Hall sensor or magnetoresistive sensor. FIG. 7B shows an alternative lateral arrangement for the integrated circuit, which makes it possible to observe the angular position of a magnet placed laterally along the magnet. Alternatively, also an optical encoder may be used to measure the angle of the pivoting shaft, in particular by means of LEDs, reflectors and photodetectors.

FIG. 8 shows a schematic perspective assembled simplified view of a fifth embodiment of an adjusting instrument 1 according to the invention in a work angular position α corresponding to the work position II. In this embodiment, the adjusting instrument 1 comprises a flanged edge 16 which is pivotable around the pivoting shaft 4 and which is configured to pivot along with the housing 5. The flanged edge 16 comprises a recess 17, for example in the form of a radial slot in the flanged edge 16. The detector 7 is switchable by movement of the housing 5 and associated movement of the flanged edge 16 relative to the foot 3, between the confirming condition corresponding to the work angular position α, and a non-confirming condition corresponding to an angular position β rotated from the work angular position α. To this end, the detector 7 of the fifth embodiment comprises an optical encoder 18, in particular with a light source, such as for example one or more LEDs, which cooperates with reflectors and photodetectors. The optical encoder 18 is arranged on the printed board 9 (PCB) included in the adjusting instrument 1. As is known to a person skilled in the art, an optical encoder 18 usually comprises a light source, not shown, for emitting a light ray, not shown, whereby the light ray's being interrupted or not corresponds to one of the confirming condition corresponding to the work angular position α and the non-confirming condition corresponding to the rotated angular position β.

In this embodiment, the light ray in the work angular position α can pass the recess 17 in the flanged edge 16 and fall onto a sensor, not shown, such as, for example, a photodetector, for the purpose of verification. In the work angular position α, the optical encoder 18 is in the confirming condition. In the angular position β rotated outside the work angular position α, the flanged edge 16 interrupts and/or reflects the light ray, and the optical encoder 18 enters the non-confirming condition, for example in that photodetectors, not shown, detect a reflection of the light ray or in that the light ray does not reach the photodetectors. Conversely, the flanged edge 16 may be provided not with a recess 17 but with a radial projection, this projection taking care of interruption and/or reflection of the light ray for the purpose of the verification. In the work angular position α the radial projection interrupts and/or reflects the light ray, and the optical encoder 18 is in the confirming condition. Vice versa, upon passage of the light ray in the absence of a flanged edge 16 and/or the radial projection in the rotated angular position β, the optical encoder 18 is in the non-confirming condition. Additionally or alternatively, the light source may for instance be, or comprise, a laser which can emit a laser beam, that is, a relatively precise light ray. In that case, for instance, the laser beam can reach through a recess 17 in the form of a hole in the flanged edge 16 and thus pass the flanged edge 16, for the purpose of the verification. Naturally, the recess 17 in the form of a hole may also be used with the earlier-described light source which emits a light ray.

Thus, there has been described an adjusting instrument for an exterior vision unit for a vehicle, comprising a base, comprising a foot and a pivoting shaft extending therefrom along a longitudinal axis, and a housing which surrounds the pivoting shaft, and which is pivotable around the longitudinal axis of the pivoting shaft in an adjustment range, between at least a park position and a work position. The base and the housing cooperate via cams which interlock in the work position so that the housing is in a stable axial ground position with respect to the foot. The cams, upon pivoting of the housing relative to the base, move apart with respect to each other from the work position along the longitudinal axis, and upon further pivoting are supported on each other, so that the housing is in an axially further removed position with respect to the foot than in the work position. The adjusting instrument is furthermore provided with a detector which is configured to verify that the housing is in the stable axial ground position.

It is noted that the invention is not limited to the exemplary embodiments described here. The adjusting instrument may for instance be provided with many other functions, such as a stop which, during manual adjustment from the work position both in the direction of the park position and in the direction of the fold-over position, forms a physical or aural stop which is not present during electric adjustment, at least adjustment in the direction of the park position. Such a function is known as 'double detent'. Also, the cooperating cams may be spring loaded in the work position, for example by a helical spring included around the pivoting shaft, and this spring load may be removed before the housing pivots electrically from the work position relative to the base. This may be implemented, for instance, in that the drive makes an internal stroke, as a result of which the spring force is transferred from the housing to the base. The housing may to that end be provided with a coupling ring, and the base may to that end be provided with a cam ring. Such functions of adjustment devices are known per se, and are described, for example, in WO 2005/075249, WO 2012/047104 and WO 2017/074193.

Such variants will be apparent to the person skilled in the art and are understood to fall within the scope of the invention as set forth in the following claims.

LIST OF REFERENCE SIGNS

1. Adjusting instrument
2. Base
3. Foot
4. Pivoting shaft
5. Housing
6. Cams
6a. Base cam ring
6b. Housing cam ring
7. Detector
8. Switch
9. Printed circuit board
10. Arm
11. Stop
12. Rotation sensor
13. Contact surfaces
14. Sensor
15. Axial movement
16. Flanged edge
17. Recess
18. Optical encoder
I Park position
II Work position
III Fold-over position
A Stable axial ground position
B Removed position
L Longitudinal axis
α Work angular position
β Rotated angular position

The invention claimed is:

1. An adjusting instrument for an exterior vision unit for a vehicle, comprising:
   a base, comprising a foot and a pivoting shaft extending therefrom along a longitudinal axis;
   a housing which surrounds the pivoting shaft, and which is pivotable around the longitudinal axis of the pivoting shaft in an adjustment range, between at least a park position and a work position; and
   a detector, wherein
   the base and the housing cooperate via cams which in the work position interlock without mutual rotational play so that the housing is thereby rotation-locked in a single stable axial ground position with respect to the foot, and which upon any pivoting of the housing relative to the base from the work position are driven apart relative to each other along the longitudinal axis by interaction among the cams, and upon further pivoting are supported on each other, so that the housing is in an axially further removed position with respect to the foot than in the work position, and
   the detector is configured to verify that the housing is in the single stable axial ground position.

2. The adjusting instrument according to claim 1, wherein the detector by movement of the housing relative to the foot is switchable between a confirming condition corresponding to the stable axial ground position, and a non-confirming condition corresponding to a position removed from the ground position.

3. The adjusting instrument according to claim 1, wherein the detector by axial movement of the housing relative to the foot is switchable between a confirming condition corresponding to the stable axial ground position, and a non-confirming condition corresponding to a position axially removed from the ground position.

4. The adjusting instrument according to claim 1, wherein the detector by rotation of the housing relative to the foot is switchable between a confirming condition corresponding to a work angular position correspondent with the work position, and an angular position rotated with respect to the work angular position, which corresponds to a non-confirming condition.

5. The adjusting instrument according to claim 1, wherein the detector comprises cooperating electric contact surfaces.

6. The adjusting instrument according to claim 1, wherein the detector comprises a switch.

7. The adjusting instrument according to claim 6, wherein the switch is arranged on a printed board, included in the adjusting instrument, and wherein the switch is provided with an arm which cooperates with a stop on the base.

8. The adjusting instrument according to claim 1, wherein the detector comprises a sensor to verify that the housing is in the stable axial ground position.

9. The adjusting instrument according to claim 8, wherein the sensor comprises a pressure sensor, a capacitive sensor, an inductive sensor, a resistive sensor, a light sensor, a piezoelectric sensor, a potentiometer, or a Hall sensor.

10. The adjusting instrument according to claim 1, wherein the cooperating cams are provided on, respectively, the base and the housing.

11. The adjusting instrument according to claim 10, wherein the cooperating cams comprise respectively a base cam ring provided on the base and a housing cam ring provided on the housing, which in the adjustment range interlock only in the work position.

12. The adjusting instrument according to claim 10, wherein the cooperating cams are provided on, respectively, the foot of the base and the housing.

13. The adjusting instrument according to claim 1, wherein the axially further removed position is a position raised with respect to the foot.

14. The adjusting instrument according to claim 1, wherein the adjustment range comprises a park position and a fold over position, with a work position, corresponding to a drive position, located therebetween.

15. The adjusting instrument according to claim 1, wherein the housing encloses the detector such that the detector is screened off from the surroundings.

16. The adjusting instrument according to claim 1, wherein the housing is adjustable relative to the base via an electric drive operative between the housing and the base.

17. The adjusting instrument according to claim 16, wherein the electric drive is provided with a current limiting circuit which is configured to switch off upon an electric motor coming to a halt.

18. An exterior vision unit for a vehicle, comprising an adjusting instrument according to claim 1, and mirror, display, LIDAR, electronic monitoring means and/or camera coupled with the housing.

* * * * *